United States Patent [19]

Tyler et al.

[11] 3,974,430

[45] Aug. 10, 1976

[54] MOTOR PROTECTION CIRCUIT

[75] Inventors: Hugh J. Tyler, Santa Ana; Dennis E. Newell, El Segundo, both of Calif.

[73] Assignee: Robertshaw Controls Company, Richmond, Va.

[22] Filed: Sept. 6, 1974

[21] Appl. No.: 503,814

[52] U.S. Cl. .............................. 318/473; 318/481; 318/484; 317/41
[51] Int. Cl.² .......................................... H02H 5/04
[58] Field of Search ........... 318/471, 473, 481, 484; 317/22, 40, 41, 42

[56] References Cited
UNITED STATES PATENTS

| | | | |
|---|---|---|---|
| 3,742,303 | 6/1973 | Dageford | 317/13 A |
| 3,753,043 | 8/1973 | Plouffe | 317/41 |
| 3,777,240 | 12/1973 | Neill | 318/471 |

Primary Examiner—Gene Z. Rubinson
Assistant Examiner—John J. Feldhaus
Attorney, Agent, or Firm—O'Brien & Marks

[57] ABSTRACT

A motor protection circuit employs a resistance bridge circuit with one side having multiple branches containing temperature responsive resistances for sensing an overheat condition in the motor. Semiconductor voltage sensing devices, such as high gain amplifiers, are responsive to voltages between a standard sensing node and each of the sensing nodes in the multiple branched side of the bridge circuit. Logic facilities respond to any of the sensing devices to operate switching facilities controlling energization of the motor. Additionally, the protection circuit may include a lubricating oil pressure responsive control which is not affected by power loss or spurious signals, and which may be controlled by the operation of a motor control switch.

13 Claims, 5 Drawing Figures

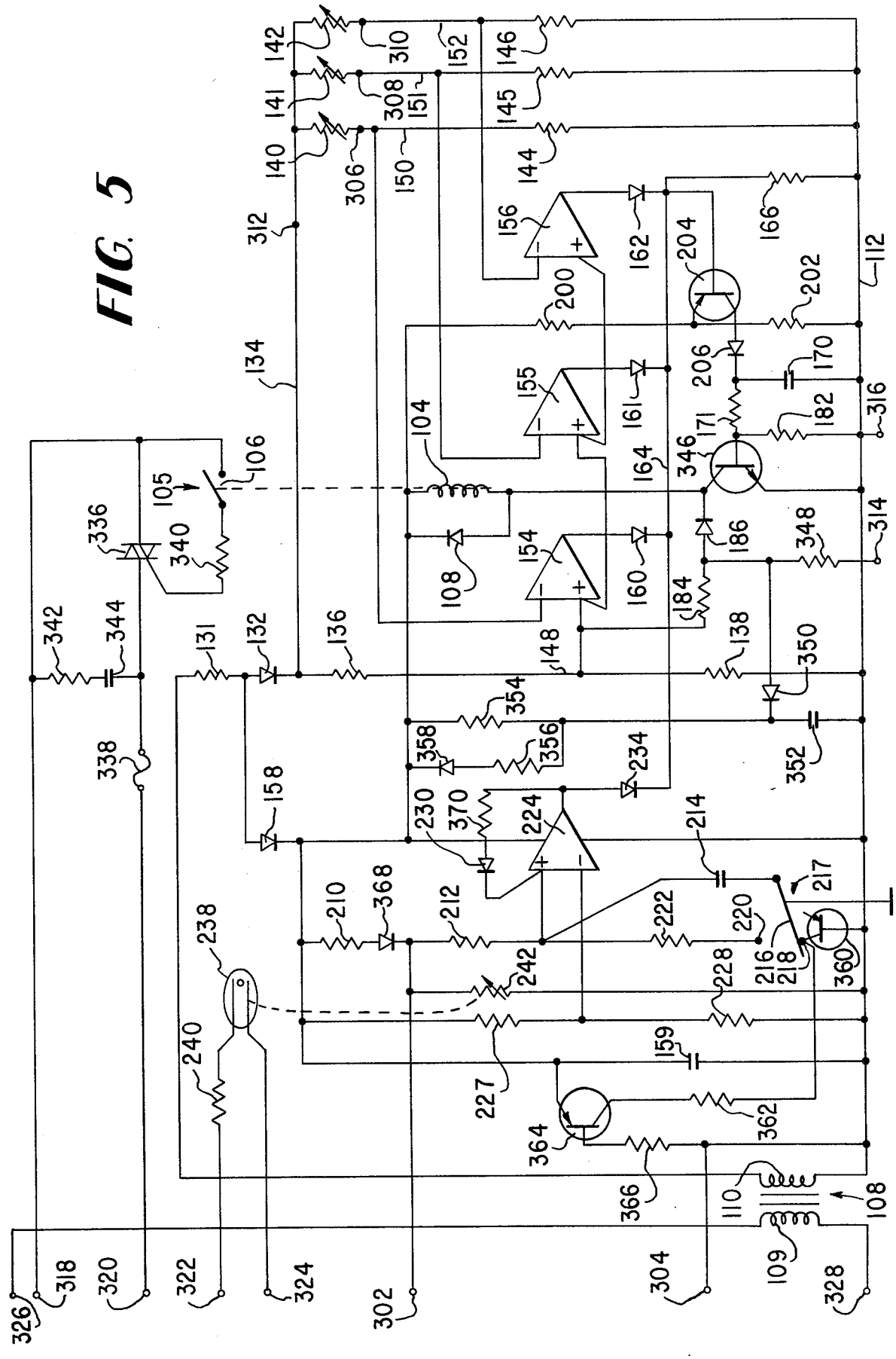

MOTOR PROTECTION CIRCUIT

BACKGROUND OF THE INVENTION

1. Field of the Invention

The invention relates to control circuits, and in particular, to control circuits for electric motors which have facilities for terminating the operation of the motor in the event of a defective condition. For example, such an electric motor can be a three-phase compressor motor of a refrigerating system, an air conditioning system, or the like.

2. Description of the Prior Art

The prior art, as exemplified in U.S. Pat. Nos. 2,945,133, 3,102,677, 3,155,878, 3,290,576, 3,312,081, 3,329,869, 3,366,843, 3,377,816, 3,404,313, 3,416,060, 3,526,809, 3,555,356, 3,562,587, 3,577,741, 3,599,439, 3,648,074, 3,673,811, 3,693,047, 3,712,991, and 3,787,793, contains a number of control circuits including circuits responsive to overheating of a motor winding or to loss of oil pressure for terminating the energization of a motor.

In addition to the above-mentioned patents, a prior art motor protection circuit is illustrated in FIG. 1, wherein a triac 10 is connected in series with a winding 11 of a contactor, indicated generally at 12, and a control switch, such as a thermostat switch 13, between AC power terminals 14 and 15. The contactor 12 has normally open contacts 16, 17 and 18 connected in series with respective input lines 20, 21 and 22 from a three-phase power source 24 to a three-phase motor 26. A gate electrode of the traic 10 is connected by contacts 28 of a relay, indicated generally at 29, in series with a resistance 30 to the terminal 15. A transformer, indicated generally at 32, has a primary winding 33 connected across the terminals 14 and 15. A first secondary winding 34 of the transformer 32 is connected in a loop circuit with a winding 36 of the relay 29 and the anode and cathode electrodes of a silicon controlled rectifier (SCR) 37. Another secondary winding 38 of the transformer 32 has end taps 39 and 40 connected in a second loop circuit including a resistance 42, a resistance 44, and three parallel branch circuits which include, respectively, a thermosensing resistance 45 in series with a resistance 46, a thermosensing resistance 47 in series with a resistance 48, and a thermosensing resistance 49 in series with a resistance 50. The thermosensing resistances 45, 47 and 49 are lengths of positive temperature coefficient wires which are imbedded in the respective three-phase windings of the motor 26. A center tap 53 of the winding 38 is connected to the junction of the winding 34 with the cathode of the SCR 37. The gate electrode of the SCR 37 is connected to the anodes of diodes 54, 55 and 56 which have their cathodes connected, respectively, to the junction 58 of the thermosensing resistance 45 and resistance 46, to the junction 59 of thermosensing resistance 47 and resistance 48, and to the junction 60 of thermosensing resistance 49 and resistance 50. A resistance 62 and a capacitance 64 are connected between the end tap 39 and the gate electrode of the SCR 37. A capacitance 66 and a resistance 68 are connected in parallel across the cathode and gate electrodes of the SCR 37. Normally open contacts 70 of the relay 29 are connected across the resistance 42. A capacitance 74 is connected across the relay winding 36.

The circuit of FIG. 1 forms a bridge circuit with taps 39 and 40 of the secondary winding 38 forming the power nodes, the center tap 53 forming a first sensing node, and the junctions 58, 59 and 60 forming multiple second sensing nodes. The respective portions of the winding 38 on opposite sides of the center tap 53 form first and second arms of the bridge circuit; the resistors 42 and 44 and the thermosensing resistances 45, 47 and 49 form a third arm which divides into multiple branches in the bridge circuit; and the resistances 46, 48 and 50 form multiple fourth arms of the bridge circuit.

In operation of the prior art circuit of FIG. 1 under normal conditions, the triac 10 is conductive to allow the control switch 13 to control the operation of the contactor 12 and thus the motor 26. The transformer 32 is energized by current from terminals 14 and 15 to produce AC current from the secondary winding 38 through the resistance 62 and capacitance 64 generating a voltage across the resistance 68, the capacitance 66 and the gate-cathode electrodes of the SCR 37. The capacitor 64 phase shifts the current therethrough to lead the voltage across taps 39 and 53 and to compensate for the phase shift lag caused by the capacitor 66 which protects the SCR 37 against spurious high voltage pulses. The resistors 62 and 68 aid in dividing the voltage across taps 39 and 53 to present a suitable voltage to the gate-cathode electrodes of SCR 37. During positive half cycles, the SCR 37 is triggered conductive by the gate-cathode voltage to energize the relay winding 36 which closes the contacts 28 to render the triac 10 conductive. The capacitor 74 charges during positive half cycles to help maintain energization of relay winding 36 during negative half cycles when the SCR 37 is non-conductive.

Operation of relay 29 also closes contacts 70 to shunt the resistance 42 and set the characteristics of the bridge circuit responsive to temperatures equal to or above a first temperature of about 121°C (250°F). Under normal conditions, the temperature of the windings of the motor 26 will be below 121°C. The voltages on the nodes 58, 59 and 60 due to the low temperature resistance values of thermosensing resistances 45, 47 and 49 are greater than the voltage on tap 53 by more than the required triggering voltage of the SCR 37. During the positive half cycles across SCR 37, the diodes 54, 55 and 56 remain nonconductive at voltages on the gate electrode of SCR 37 less than the respective voltages on the nodes 58, 59 and 60.

When the temperature of one or more of the thermosensing resistances 45, 47 and 49 rises above 121°C, the voltage on one or more of the respective nodes 58, 59 and 60 is lower than the voltage on the gate electrode of SCR 37 required to trigger the SCR 37. The respective diode or diodes 54, 55 or 56 become conductive and shunt the gate electrode of the SCR during positive half cycles to prevent triggering and conductivity of the SCR 37. Thus, the relay 36 is deenergized and the contacts 28 are opened rendering the triac 10 nonconductive to deenergize the winding 11 and open the contacts 16, 17 and 18 preventing operation of the motor 26 to avoid heat damage to the windings aand insulation of the motor 26. When relay 29 is deenergized, the contacts 70 open to insert the resistance 42 into the bridge circuit which is thus reset to prevent reenergization of relay 29 until the temperature of all the thermosensing resistances 45, 47 and 49 fall below a second temperature of about 71°C (160°F); the increase in resistance in series with the thermosensing resistances 45, 47 and 49 lowers the voltage on nodes 58, 59 and 60 to maintain conductivity of the diodes 54, 55 and 56 to prevent triggering voltages on SCR 37. The time required for the motor windings to cool from 121°C to 71°C provides a time delay which can allow the cause of the overheating to correct itself; refrigeration compressor motors can be prevented from starting by a high refrigerant pressure in the compressor, and the delay can provide time for the pressure to bleed off.

Prior art motor protection circuits which sense the temperature of windings of a motor have been subject to long term calibration drift due to changes in ambient temperature of bridge resistors, transformer windings, bias resistors, phase shift capacitors, logic diodes, and the gate characteristics of SCR's; such calibration drift making the circuits unreliable in preventing motor winding damage or unnecessarily terminating operation of the motors unless special and expensive low drift parts are used. The prior art bridge circuits for multiple winding temperature sensing required a special multiple tap transformer which was expensive. Prior art circuits with multiple temperature sensing branch circuits did not provide complete isolation between the temperature sensing branch circuits. Also, the prior art circuits utilized a relay to provide a temperature differential, such relay being expensive and subject to chatter, vibration sensitivity, and variation of contact resistance thus affecting the basic calibration of the circuits. Further, the prior art thermosensing circuits required trimming of resistances and/or capacitors, or the employment of variable resistors which are often subject to failure.

In motor protection circuits where an electronic timing circuit is used to terminate operation of a motor after a duration of the absence of lubricating oil pressure; power failures, spurious voltage pulses, and intermittent operation of an oil pressure sensing switch can cause erratic and erroneous operation of motor energization control circuits.

SUMMARY OF THE INVENTION

The invention is summarized in that a protection circuit for a motor having first and second windings comprises a first voltage dividing circuit including first and second serially connected resistances; a second voltage dividing circuit including third and fourth serially connected resistances; the third and fifth resistances being temperature responsive resistances capable of sensing temperature conditions in the first and second windings, respectively, first voltage responsive semiconductor means having inputs connected between the junction of the first and second resistances and the junction of the third and fourth resistances; second voltage responsive semiconductor means having inputs connected between the junction of the first and second resistances and the junction of the fourth and fifth resistances; switch means for controlling motor energization; and logic means, responsive to the outputs of the first and second voltage responsive semiconductor means indicating a voltage corresponding to an excessive temperature in any of the first and second windings of the motor, for operating the switch means.

An object of the invention is to construct a highly reliable motor protection circuit utilizing available precision resistors in a pure resistance bridge.

Another object of the invention is to eliminate the relays employed in circuits responsive to different temperatures upon normal startup conditions and upon startup conditions after excessive temperature shut down of a motor.

It is also an object of the invention to provide complete isolation among three temperature sensing legs so that temperature variations in one leg do not change the temperature response of the other legs.

A further object of the invention is to eliminate calibration adjustment labor, troublesome adjustable resistors and expensive multiple tap transformers from motor protection circuits.

A still further object of the invention is to eliminate erratic and erroneous operation of a motor energization control circuit caused by power failures, spurious voltage pulses, intermittent operation of oil pressure sensing switches and the like.

One advantage of the invention is that sensitivity to temperature drift in parameters of transformer windings, bias resistors, phase shift capacitors, logic diodes, and semi-conductor elements, such as silicon controlled rectifiers, is substantially reduced.

An additional feature of the invention is the employment of high gain amplifiers, such as integrated circuit amplifiers, for sensing bridge node voltages to eliminate changes in operation points of the bridge due to current drain and to provide high sensitivity to a small voltage range.

Other objects, advantages, and features of the invention will become apparent from the following description of the preferred embodiments taken in conjunction with the accompanying drawings.

BRIEF DESCRIPTION OF THE DRAWINGS

FIG. 5 is detailed diagram of a portion of the circuit shown in FIG. 4.

DESCRIPTION OF THE PREFERRED EMBODIMENT

Figure 1:
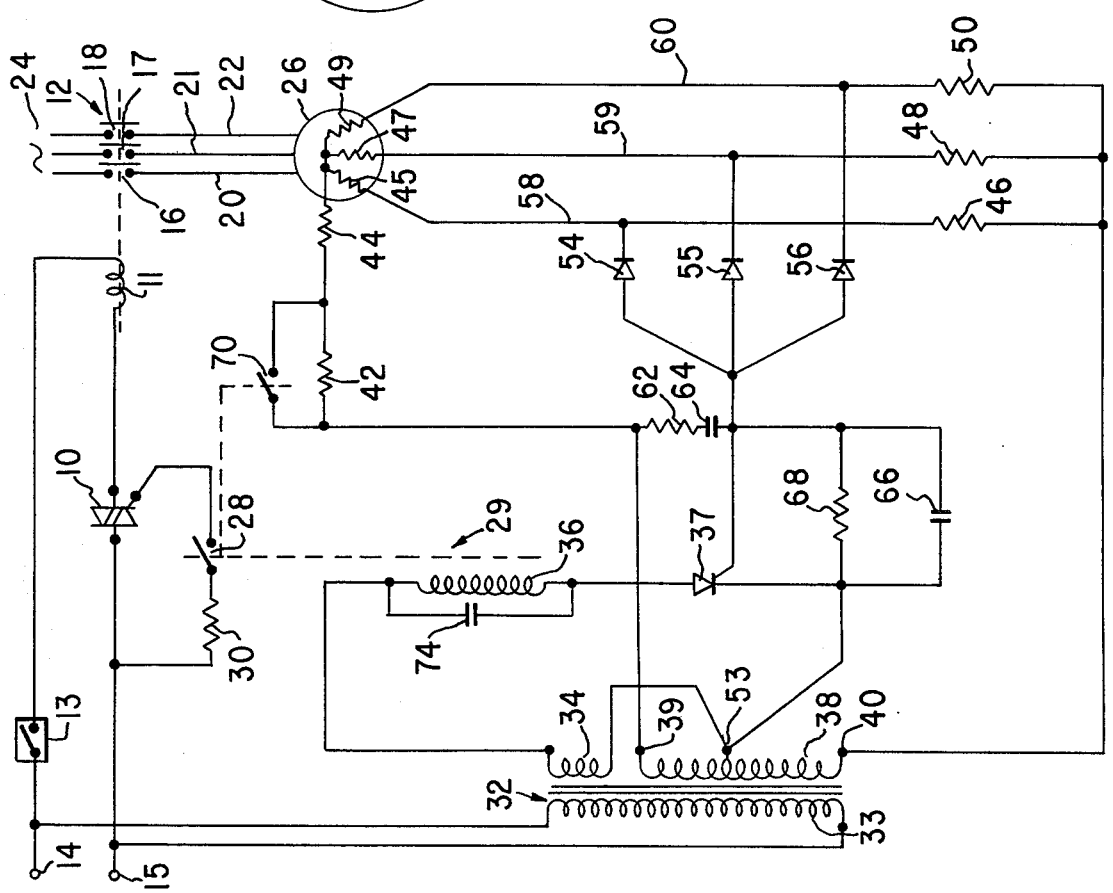
FIG. 1, as previously mentioned, is a diagram of a prior art motor protection circuit.
Figure 2:
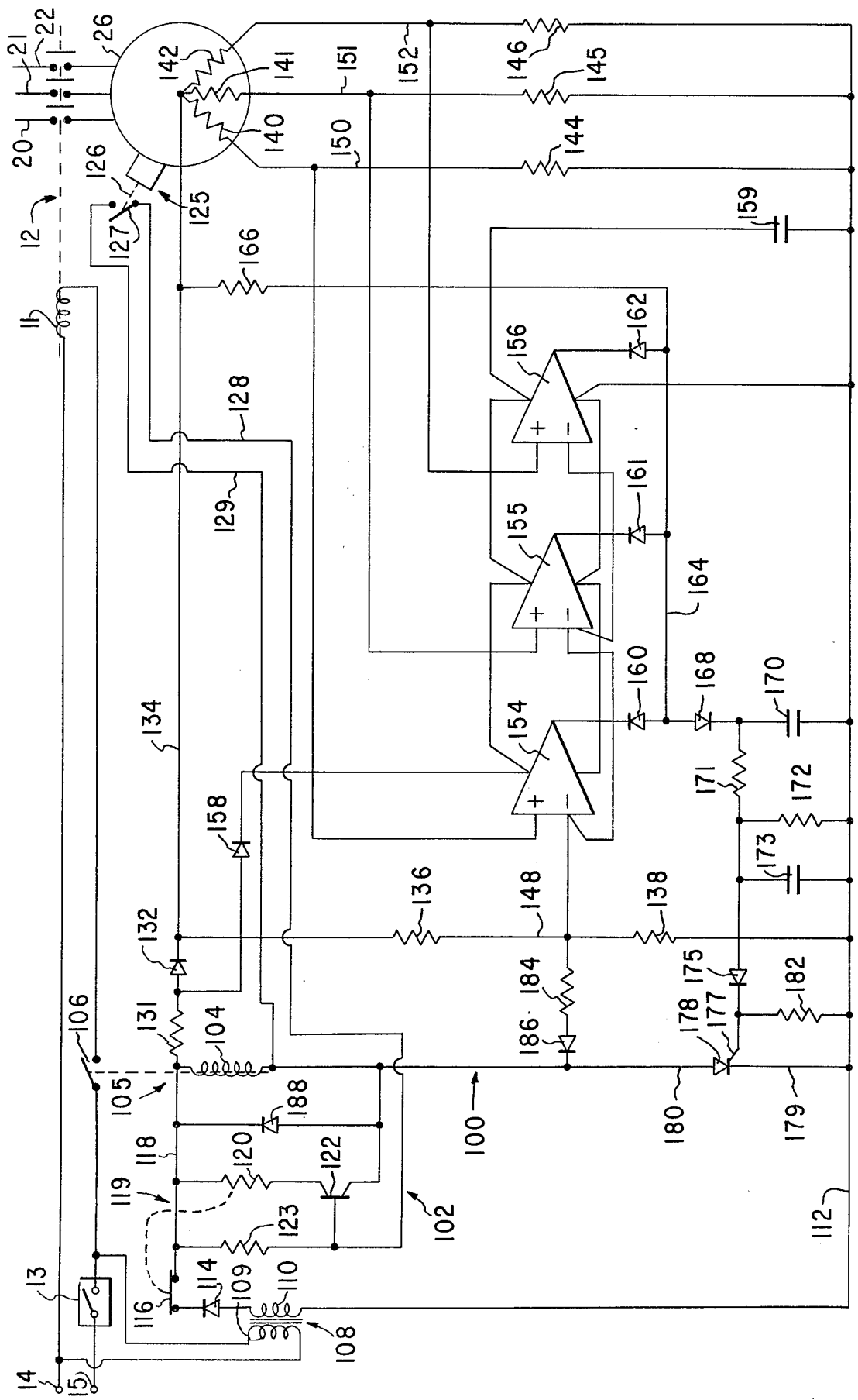
FIG. 2 is a diagram of a motor protection circuit constructed in accordance with the invention.

As illustrated in FIG. 2, the invention is embodied in a motor control circuit for the motor 26 including a motor winding temperature sensing circuit, indicated generally at 100, and a lubricating oil pressure responsive circuit, indicated generally at 102, for controlling the energization of a winding 104 of a relay indicated generally at 105 which has contacts 106 in series with the control switch 13 and the contactor winding 11 in a motor contactor energizing circuit. Parts of the circuit, particularly the motor contactor energizing circuit, are identified by numerals used to identify parts of the circuit in FIG. 1, indicating that such commonly identified parts have substantially similar structure and/or function.

A step down an isolation transformer, such as a twenty-four volt transformer 108, has a primary winding 109 connected in series with the control switch 13 across the terminals 14 and 15. A secondary winding 110 of the transformer 108 has one end connected to a ground or common terminal 112. The primary winding 109 and the secondary winding 110 are isolated from each other. The other end of the secondary winding is connected in series with a diode 114 and contacts 116 to a first voltage supply terminal 118. The contacts 116 are normally closed contacts of a delay relay, indicated generally at 119, of the oil pressure responsive circuit 102 which has an actuator or a resistance heater 120 of the relay 119 connected in series with the collector-emitter electrodes of a transistor 122 across the relay winding 104. The time delay relay 119 is preferably the type which latches open when opened by the actuator 120 and requires manual resetting to close the contacts 116 after being opened. A biasing resistance 123 is connected between the voltage terminal 118 and the base electrode of the transistor 122. A normally open lubricating fluid or oil pressure sensing switch, indicated generally at 125 has an operator 126 for closing contacts 127 in response to a predetermined lubricating oil pressure applied to the motor 26. The contacts 127 are connected by electrical lines 128 and 129 across the base-emitter electrodes of the transistor 122.

A resistance 131 and a diode 132 are serially connected between the first voltage junction 119 and a second voltage supply junction 134 in the temperature sensing circuit 100. A resistance 136 is connected in series with a resistance 138 across the terminals 134 and 112. Similarly, thermosensing resistances 140, 141 and 142 are connected in series with respective resistances 144, 145 and 146 across the terminals 134 and 112. The thermosensing resistances 140, 141 and 142 are similar to the thermosensing resistances 45, 47 and 49 of FIG. 1.

The resistances 136, 138, 140, 141, 142, 144, 145 and 146 form a resistance bridge circuit wherein the terminals 112 and 134 are power input nodes, the junction 148 between resistances 136 and 138 is a first sensing node, and the junctions 150, 151 and 152 between the respective resistances 140 and 144, 141 and 145, 142 and 146 form multiple second sensing nodes. The resistances 136 and 138 form first and second arms of the bridge circuit, the thermosensing resistances 140, 141 and 142 form multiple third arms, and the resistances 144, 145 and 146 form multiple fourth arms.

Semiconductor voltage responsive devices, such as high gain amplifiers 154, 155, 156, have their respective negative inputs all connected to the first sensing node 148 and have their positive inputs connected to the respective second sensing nodes 150, 151 and 152. Power supply inputs of the amplifiers 154, 155 and 156 are connected between the terminal 112 and a diode 158 from the junction of the resistance 131 and the diode 132. A filter capacitor 159 is connected across the power supply inputs of the amplifiers 154, 155 and 156 to provide a filtered D. C. supply voltage. The outputs of the integrated circuit amplifiers 154, 155, and 156 are connected to cathodes of respective diodes 160, 161 and 162 which have their respective anodes connected to a junction 164 which is connected by a biasing resistance 166 to the terminal 134. The diodes 160, 161 and 162 and the resistance 166 form an OR-logic circuit with the junction 164 being the output.

A diode 168 connects the junction 164 to a filtering circuit which includes a capacitor 170 connected between the diode 168 and the terminal 112, resistances 171 and 172 connected in a voltage divider across the capacitor 170, and a capacitor 173 connected across the terminal 112 and the junction between of the resistors 171 and 172. The junction of the capacitor 173 with the resistances 171 and 172 is connected by a diode 175 to the gate electrode 177 of a semiconductor switch device, such as an SCR 178, which has its cathode electrode 179 connected to the terminal 112 and its anode electrode 180 connected in series with the winding 104 to the first voltage terminal 118. A bias resistance 182 is connected between the gate electrode 177 and the terminal 112. A resistance 184 and a series diode 186 are connected between the first sensing node 148 and the anode electrode 180 of the SCR 178. A diode 188 is connected across the winding 104 with the cathode of the diode 188 connected to the terminal 118.

In operation of the motor control circuit of FIG. 2 the closing of control switch 13 energizes both the temperature sesing circuit 100 and the oil pressure responsive circuit 102. Under normal conditions when the temperature of the temperature sensing resistances 140, 141 and 142 are below 71°C, the energization of the sensing circuit causes the operation of relay 105 to close contacts 106 to complete the energization circuit for contactor 12 and to energize the motor 26. If the temperature of any of the temperature sensing resistances 140, 141 and 142 is above 71°C when switch 13 is initially closed or if the temperature of any of the temperature sensing resistances 140, 141 and 142 rises above 121°C after the switch 13 is closed, the relay 105 remains or will become deenergized to prevent or terminate energization of the motor 26. Also if sufficient oil pressure is not sensed after a delay, the relay 105 is deenergized terminating energization of the motor 26.

More particularly, the closing of the control switch 13 energizes the tranformer 108 which produces positive current pulses through diode 114 and contacts 116 to generate rectified positive voltage on terminal 118 which is passed by resistance 131 and diode 132 to terminal or node 134. When the windings of the motor 26 all have a temperature below 71°, the voltage pulses on all the nodes 150, 151 and 152 are positive with respect to node 148. The amplifiers 154, 155 and 156 produce positive outputs which render the diodes 160, 161 and 162 all non conductive to allow the junction 164 to be positive from current through resistance 166. Positive pulses though diode 168 are filtered by capacitors 170 and 173 and resistors 171 and 172 to produce a suitable magnitude of filtered voltage which is applied though diode 175 to the gate electrode 177 triggering the SCR 178 into its conductive state. Positive current pulses though winding 104 and SCR 178 energize the relay 105 closing the contacts 106 to energize the motor 26. Between positive pulses on terminal 118, the diode 188 provides a circuit path for current produced by collapse of the magnetic field in winding 104, tending to maintain relay 105 operated as well as preventing high voltage peaks generated by the collapsing of the magnetic field.

When the SCR 178 is conductive an electrical path is completed from the anode electrode 180 to the cathode electrode 179 to connect the diode 186 and the resistance 184 across the resistance 138. The resistance 184 shunting the resistance 138 lowers the voltage on the node 148 which changes the temperature response of the bridge circuit so that the voltages on the nodes 150, 151 and 152 will be positive with respect to node 148 until the thermosensing resistances 140, 141 and 142 sense a temperature greater than 121°C.

When there is a defective condition in that one or more of the windings of motor 26 are above 71°C prior to start up or rise above 121°C after operation of relay 105, the voltage on one or more of the nodes 150, 151 and 152 will be lower than the voltage on node 148, thus causing the output of a respective amplifier or amplifiers 154, 155 or 156 to be near ground or at a low voltage. A respective diode or diodes 160, 161 or 162 will be conductive shunting the pulses from resistor 166 to the ground output of the amplifiers producing zero output from the filter circuit though diode 175 to prevent triggering of SCR 178. The relay 105 is not energized and the contacts 106 are open preventing energization of the contactor winding 11.

After the motor 26 is energized the voltage across the winding 104 produces current though heater resistance 120 and transistor 122 which is biased conductive by current though resistance 123. Under normal conditions the oil pressure sensing switch 125 will sense adequate lubricating fluid pressure after a short delay causing operator 126 to close contacts 127 shorting the base emitter junction of transistor 122 to terminate conduction though transistor 122 and the heater 120.

If the oil pressure switch 125 does not close within the predetermined time delay of the operation of time delay relay 119, the heater actuator 120 opens the contacts 116 terminating the energization of voltage terminal 118 to deenergize the relay winding 104. Thus the motor 26 is deenergized until the relay 119 is reset.

The use of a pure-resistance temperature sensing bridge with the semiconductor devices 154, 155 and 156 for sensing voltage conditions on respective nodes 150, 151 and 152 relative to node 148 results in the advantage that the operating or balance point of the temperature sensing circuit 100 can be precisely determined by Wheatstone bridge calculations. Readily available precision resistors, including linear precision thermosensing resistors such as lengths of standard positive temperature coefficient wires for the thermosensing resistances 140, 141 and 142, can be used in the manufacture of the circuit thereby eliminating all calibration adjustment labor, trimming and troublesome adjustable resistors required by the prior art circuits employing transformer secondary windings in the arms of the bridge circuit. Voltage responsive semiconductor devices particularly high gain amplifiers, such as integrated circuit operational amplifiers and the like, are extremely sensitive to a relatively small range of voltage and draw practically no current from the bridge circuit to produce no substantial effect on the operating or balance point of the bridge circuit. The circuit also has improved voltage compensation and immunity to false line transient voltage triggering due to the relatively small range of voltage sensitivity of the voltage responsive semiconductor devices 154, 155 and 156.

Further, long term calibration drift characteristics and ambient temperature calibration shift are dependent only on the bridge resistance; extremely stable precision resistors as well as accurate temperature responsive resistance wires which have a very low variation in characteristics are readily available. In the prior art, long term drift and ambient temperature shift depended upon transformer secondary windings, bias resistors, phase shift capacitors, logic diodes, gate characteristics of PNPN trigger devices such as SCR's, PUT's and the like. Temperature calibration does not change with system component warm-up as in the prior art circuits which depend upon the trigger voltage of an SCR; the prior art circuits required warm-up of the components prior to calibration thus requiring extra procedures and more assembly time.

Figure 3:
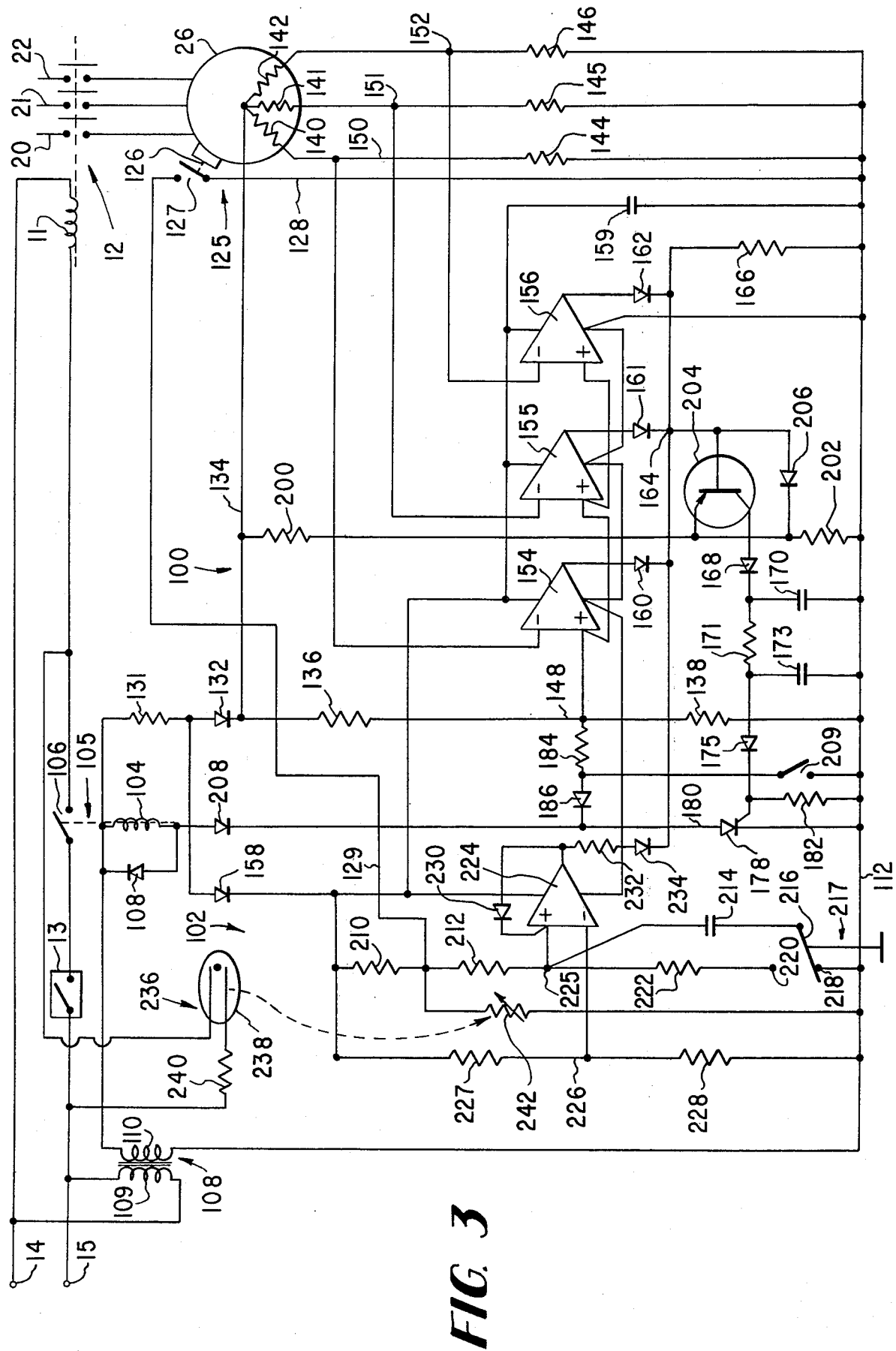
FIG. 3 is a diagram of a modified motor protection circuit constructed in accordance with the invention.

A modified circuit is illustrated in FIG. 3 wherein parts are identified by the same numbers used to identify parts of the circuits of FIGS. 1 and 2 indicating that such similarly identified parts have substantially the same or similar structure and/or function. The primary winding 109 of the step down transformer 108 is connected directly across the terminals 14 and 15.

In the temperature sensing circuit 100, the circuit of FIG. 3 differs from that of FIG. 2 in that the positive and negative inputs of the amplifiers 154, 155 and 156 of FIG. 3 are reversed from FIG. 2. Also the polarity of the diodes 160, 161 and 162 are reversed and the resistance 166 is connected to terminal 112 instead of terminal 134 to invert the operation of the OR-logic circuit. Resistances 200 and 202 are serially connected as a voltage divider across the terminals 134 and 112. A PNP transistor 204 has its emitter electrode connected to the junction of the resistors 200 and 202 and its collector electrode connected to the anode of the diode 168. The base of the transistor 204 is connected to the output point 164 of the OR-logic circuit. A diode 206 is connected across the base and emitter electrodes of the transistor 204 to prevent any substantial positive voltage on the base electrode relative to the emitter electrode. Also a diode 208 is connected serially between the winding 104 and the anode electrode 180 of the SCR 178 to protect the SCR 178 against negative voltages from the winding 104 since the diode 114 of FIG. 2 is eliminated. A thermal-sensing-circuit-reset switch 209 is connected between the terminal 112 and the junction of the resistance 184 with the diode 186.

In the oil pressure sensing circuit 102 of FIG. 3, a resistance capacitance timing circuit is connected across the capacitor 159 and includes a voltage dropping resistance 210 serially connected with a timing resistance 212 to one side of a timing capacitance 214 which has its other side connected to the contact arm 216 of a single-pole double-throw manual reset switch indicated generally at 217. A normally closed contact 218 of the switch 217 is connected to the terminal 112 while normally open contact 220 of switch 217 is connected to one end of a resistance 222 which has its other end connected to the junction of the resistance 212 with capacitance 214. A semiconductor voltage responsive device, such as a high gain amplifier 224, has its positive input connected to the junction or node 225 between the resistance 212 and the capacitance 214 while the negative input of the amplifier 224 is connected to a junction or node 226 between resistances 227 and 228 connected across the capacitance 159. The output of the amplifier 224 is connected back to the positive input of the amplifier 224 by diode 230 and is connected to the logic output 164 by series resistance 232 and logic diode 234. Isolation means such as a light operated relay, indicated generally at 236, has a neon lamp 238 connected in series with a protective resistance 240 across the control switch 13 and the contacts 106. A light-sensitive resistance 242, in proximity to be illuminated by the lamp 238 but isolated therefrom (i.e., not being directly connected therewith to avoid receiving the voltage levels from the AC motor contactor energization circuit) and having a low resistance when illuminated and a high resistance when not illuminated, is connected across the timing circuit including the timing resistance 212 and capacitance 214. The contacts 127 of the oil pressure switch 125 are connected across the series timing resistance 212 and timing capacitance 214. The value of the timing resistance 212 relative to the output resistance of the amplifier 224 is selected to allow the junction 225 to be maintained positive relative to junction 226 by current through diode 230 even though the contacts 127 of switch 125 are closed or the photo resistance 242 is in its low resistance.

In operation of the modified circuit of FIG. 3 under normal operating conditions, the secondary winding 110 of the transformer 108 continuously applies a voltage to the temperature sensing circuit 100 and the oil pressure responsive circuit 102. The relay 105 is maintained energized so that the control switch 13 controls the energization and deenergization of the contactor winding 11 so long as the temperatures sensed by the resistances 140, 141 and 142 are less than 121°C and the oil pressure responsive circuit 102, when activated, senses sufficient oil pressure.

The voltages on the outputs of amplifiers 154, 155 and 156 are near ground or at a low voltage when the voltages on nodes 150, 151 and 152 are positive with respect to node 148 to render the diodes 160, 161 and 162 non-conductive.

When both the control switch 13 and the contacts 106 are closed, the lamp 236 is dark and light sensitive resistance 242 has a high resistance value to activate the oil pressure responsive circuit 102. Current from diode 158 through voltage dropping resistance 210 and timing resistance 212 charges the timing capacitance 214. Under normal operating conditions the oil pressure sensing switch 125 closes contacts 127 shortly after startup of the motor 26 to shunt the timing resistance 212 and timing capacitance 214.

When either or both the control switch 13 and the contacts 106 are open, a voltage is produced thereacross to generate current through resistance 240 to energize the lamp 236. The light sensitive resistance 242 is illuminated to provide a low resistance shunt across the timing resistance 212 and the timing capacitance 214; thus rendering the oil pressure responsive circuit 102 deactivated.

Under normal conditions the voltage produced on terminal 225 by the charging of capacitance 214 is maintained substantially less than the voltage on terminal 226 to produce a low output from the amplifier 224 rendering the diode 234 nonconductive. With the diodes 160, 161, 162 and 234 nonconductive, the base of transistor 204 is biased negative with respect to its emitter by resistance 166 to pass current pulses from terminal 134 through resistance 200 and the emitter and collector of transistor 204 to the diode 168. The transistor 204 further narrows the range of voltage to which the amplifiers 154, 155 and 156 respond to trigger the SCR 178 while the resistors 200 and 202 produce a suitable voltage on the gate electrode of SCR 178.

When the temperature of any of the temperature sensing resistances exceeds 121°C or exceeds 71°C after excessive temperature shut down, the output voltage of the respective amplifier 154, 155 or 156 is positive to render the respective diode 160, 161 or 162 conductive. Current through the resistance 166 biases the logic output 164 and the base of the transistor 204 positive with respect to its emitter to render the transistor 204 nonconductive. Thus the current to the gate electrode of SCR 178 is terminated and motor 26 is deenergized.

The reset switch 209 may be manually closed to connect the resistance in parallel with the resistance 138 to lower the voltage on node 148 with respect to nodes 150, 151 and 152, and thus allow an attempt to start the motor 26 after an excessive temperature shutdown when the temperature sensed by the temperature sensing resistances are between 71°C and 121°C.

In the event the contacts 127 do not close within a predetermined time period which is determined by the value of the resistances 210 and 212 and the capacitance 214, the charge on the capacitance 214 will reach a sufficient level to render the junction 225 of the resistor positive with respect to the junction 226 to thus produce a positive output on the amplifier 224. Current from the positive output of the amplifier 224 passes through the resistance 232 and the diode 234 to the logic output 164 thus deenergizing the motor 26. Positive feedback through diode 230 maintains the capacitance 214 charged sufficiently to hold or latch the amplifier 224 in its positive output state even though the contacts 127 may subsequently close or the light sensitive resistance 242 returns to its low resistance state.

The oil pressure responsive circuit is reset by manual operation of the switch 217 to disconnect the contact arm 216 from the normally closed contact 218 and to connect the contact arm 216 to the normally open contact 220 and thus connect the resistance 222 across the capacitance 214 while breaking the charging circuit for the capacitance 214. After a very short period of holding the switch 217 operated the capacitance is discharged to near zero voltage that upon release of the switch 217 and reconnection of the contact arm 216 with the contact 218, the voltage on terminal 225 is dropped below the voltage on terminal 226 to change the output of the amplifier from positive voltage to a low voltage. Thus the motor 26 is allowed to be energized for another timing period of charging the capacitance 214. The double-throw single-pole reset switch 217 has the advantage that the operation of the oil pressure responsive circuit 102 can not be bypassed by taping the switch 217 in its operated condition; disconnecting the switch arm 216 from contact 218 results in a positive voltage on terminal 225 relative to terminal 226.

Figure 4:
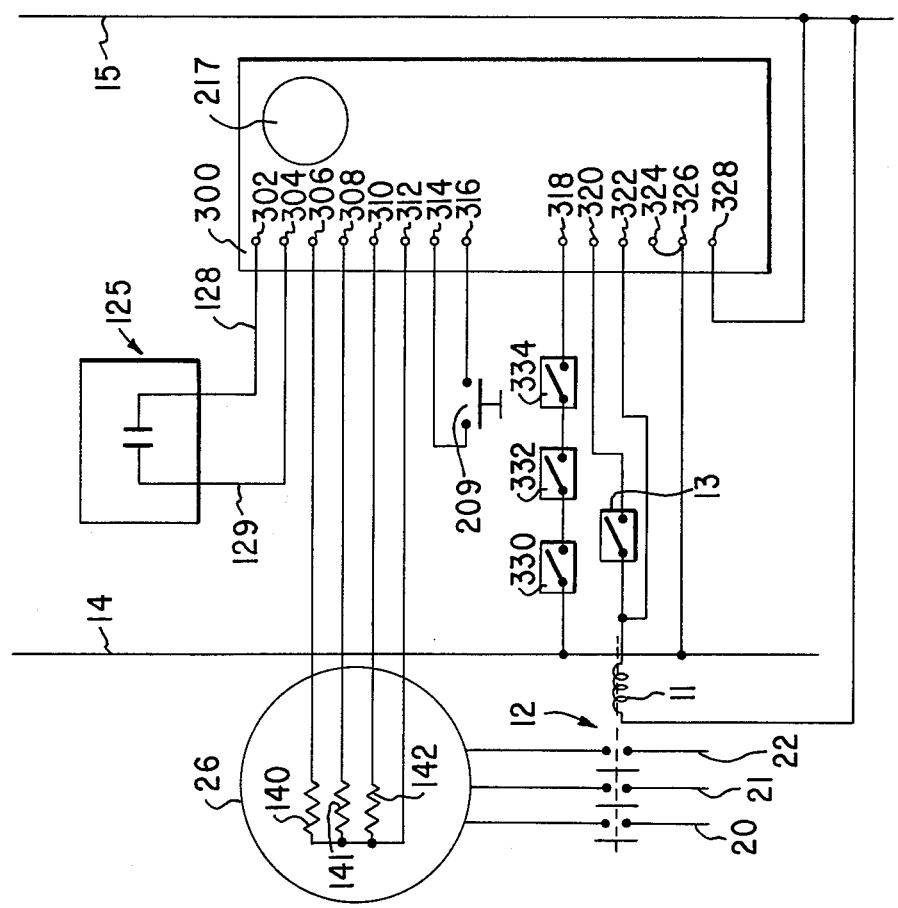
FIG. 4 is a block diagram of a still further modified circuit constructed in accordance with the invention.

As shown in FIGS. 4 and 5 another modified circuit has parts identified by the same numbers used to identify parts in the circuits of FIGS. 1, 2 and 3 indicating that such commonly identified parts have substantially the same or similar structure and/or function. In FIG. 4, a unit or housing 300 has terminals 302, 304, 306, 308, 310, 312, 314, 316, 318, 320, 322, 324, 326 and 328 along with the switch 217 mounted therein. The lines 128 and 129 connect the oil pressure responsive switch 125 between the terminals 302 and 304. The temperature responsive resistances 140, 141 and 142 are connected at their one ends to the terminal 312 and at their other ends to the respective terminals 306, 308, and 310. The temperature reset switch 209 is connected between the terminals 314 and 316. The control switch 13 and the contactor winding 11 are serially connected between the terminal 320 and the power terminal or line 15 while the terminal 322 is electrically joined to the junction between the switch 13 and the winding 11. The terminals 324 and 326 are both connected to power terminal or line 14, and the terminal 328 is connected to power line 15. Other control switches 330, 332 and 334, such as a manual switch, a timer switch, an excessive condensor coil temperature switch, a refrigerant pressure switch or the like, are connected between terminal 318 and the power line 14.

The circuitry contained in the unit 300 is illustrated in FIG. 5, and includes a triac 336 and a fuse 338 connected serially between the terminals 318 and 320 to complete the contactor energizing circuit. Contacts 106 of the relay 105 are connected in series with a resistance 340 between the terminal 318 and the control electrode of the triac 336. A resistance 342 and a capacitance 344 are serially connected across the traic 336 and have values selected to limit the rate of voltage rise across the triac 336 to prevent false triggering.

An NPN transistor 346 has its emitter and collector electrodes connected serially with the winding 104 of the relay 105 across the capacitor 159. Also the resistances 200 and 202 are connected across the capacitance 159. The base of the transistor 346 is connected to the junction of the resistances 171 and 182 on the output of the filter circuit. A resistance 348 is interposed between the terminal 314 to the reset switch and the junction between the resistance 184 and diode 186. A diode 350 is connected between the junction of the resistance 184 and the diode 186 to the junction of a capacitance 352 and a resistance 354 connected in series across the capacitance 159. A resistance 356 and a diode 358 are connected across the resistance 354.

In the oil pressure responsive portion of the circuitry in FIG. 5, a PNP, transistor 360 has its collector and base electrodes connected between the normally closed contact 218 of the switch 217 and the common terminal 112. The collector of the transistor 360 is connected by resistance 362 to the collector of a PNP transistor 364 which has its emitter electrode connected to the junction of the diode 158 and the capacitance 159. The base electrode of the transistor 364 is connected by a resistance 366 to the common terminal 112.

In addition, the modified circuit of FIG. 5 includes a diode 368 between the resistance 210 and the resistance 212. The integrated circuit amplifier 224 has a resistance 370 connected in series with the feed back diode 230 to limit the feedback and reduce a tendency for momentary power interruptions to cause a transient change of amplifier 224 to its positive output state.

The terminals 326 and 328 are connected to respective ends of the primary winding 109 of the transformer 108, the terminals 322 and 324 are connected to the series resistance 240 and lamp 238, the terminal 302 is connected to the junction of the diode 368 and the resistance 212, and the terminals 304 and 316 are connected to the common terminal 112. The terminal 312 is joined to the node 134 while the terminals 306, 308 and 310 are joined to nodes 150, 151 and 152 to connect the temperature responsive resistances 140, 141 and 142 into the bridge circuit.

In operation of the modified circuit of FIGS. 4 and 5, the energization of the contactor winding is controlled by the control switches 13, 330, 332 and 334 and the triac 336 which is controlled by relay 105 and the transistor 346. The utilization of the triac 336 in the contactor winding energization circuit allows the use of a smaller and more reliable relay 105, such as a sealed contact or reed relay. Also the smaller and less expensive transistor 346 is used to energize the relay winding 104 from the output of the filter circuit and the logic output 164.

In the event of a momentary power interruption, the capacitance 352 discharges through resistance 356 and diode 358. Upon return of power the near zero voltage across capacitance 352 effectively connects the resistance 184 and the diode 350 in shunt across the resistance 138 to allow the motor 26 to be energized if the temperature sensing resistances are below 121°C; without the capacitance 352 the temperature sensing resistances would have to cool to less than 71°C before the motor 26 would be reenergized. The capacitor 352 charges from current through resistance 354 to render the diode 350 nonconductive under normal operating conditions to prevent the voltage on capacitance 352 from affecting the calibration of the bridge circuit. The transistor 364 is normally biased conductive by current through the resistance 366 to forward bias the collector base junction of the transistor 360 and thus compleete the charging path for the timing capacitance 214. In the event of a power failure, the diode 368 and the collector base junction of the transistor 360 prevent discharge of the timing capacitance 214. The loss of power renders the transistor 364 non conductive and the reverse leakage current through the collector base junction of the transistor 360 is very small so that the timing capacitance 214 will retain its voltage for a relatively long period after the interruption of power. Thus, the oil pressure responsive circuit will remember the duration of insufficient oil pressure before power failure and thus prevent damage resutling by motor operation with insufficient oil pressure after reapplication of power.

Since many modifications, variations, and changes in detail may be made to the above described embodiments, it is intended that all matter in the foregoing description and accompanying drawings be interrupted as illustrative and not in a limiting sense.

What is claimed is:

1. A protection circuit for a motor having first and second windings comprising
   power input means;
   a first voltage dividing circuit including first and second serially connected resistances;
   a second voltage dividing circuit including third and fourth serially connected resistances;
   a third voltage dividing circuit including fifth and sixth serially connected resistances;
   said first, second and third voltage dividing circuits being connected in parallel across the power input means;
   said third and fifth resistances being temperature responsive resistances capable of sensing temperature conditions in the first and second windings, respectively;
   first voltage responsive semiconductor means having inputs connected between the junction of the first and second resistances and the junction of the third and fourth resistances;
   second voltage responsive semiconductor means having inputs connected between the junction of the first and second resistances and the junction of the fifth and sixth resistances;
   switch means for controlling motor energization; and
   logic means, responsive to the outputs of the first and second voltage responsive semiconductor means indicating a voltage corresponding to an excessive temperature in any of the first and second windings of the motor, for operating the switch means.

2. A protection circuit as claimed in claim 1 wherein the switch means for controlling motor energization includes a primary switch means having open and closed conditions for controlling the application of power to the windings of the motor, and a secondary switch means having an input lead and first and second output leads which are electrically connected when the secondary switch means is in a closed condition and which are electrically disconnected when the secondary switch means is in an open condition, said first output lead being connected to the primary switch means for placing the primary switch means in one of its open and closed conditions when the secondary switch means is in its closed condition and for placing the primary switch means in the other of its open or closed conditions when the secondary switch means in its open condition, said input lead being responsive to the logic means, said second output lead connected to one end of the first voltage dividing circuit; and wherein there is included resistance means connecting the first output lead to the junction of the first and second resistances for changing the voltage on the junction between the first and second resistances.

3. A protection circuit as claimed in claim 1 and including means responsive to a power failure for changing the voltage on the junction between the first and second resistance during a period after return of power.

4. A protection circuit as claimed in claim 1 wherein each of the first and second voltage responsive semiconductor means includes a high gain amplifier.

5. A protection circuit as claimed in claim 1 including unidirectional voltage pulse supply means connected across the first, second and third voltage dividing circuits, and filter means connected between the logic means and the switch means.

6. A motor protection circuit comprising a motor energizing A.C. circuit including control switch means in the motor energizing circuit for controlling the operation of the motor energizing circuit, unipolarity voltage means, a resistance, a capacitance serially connected with the resistance across the unipolarity voltage means, a semiconductor device for sensing a predetermined charge on the capacitance to terminate operation of the motor energizing circuit, pressure responsive switch means responsive to a predetermined lubricating fluid pressure for preventing the charging of the capacitance, and isolation means having means coupled to the A.C. circuit and having second means for preventing the charging of the capacitance when the control switch means renders the motor energizing circuit inoperable, said means coupled to the A.C. circuit and said second means for preventing the charging of the capacitance being isolated from each other.

7. A motor protection circuit as claimed in claim 6 wherein the isolation means includes a lamp connected across the control switch means, and a photo sensitive resistance exposed to illumination from the lamp and connected in a shunt circuit across the capacitance, said photo sensitive resistance having a low resistance when illuminated and a high resistance when not illuminated.

8. A motor protection circuit as claimed in claim 6 wherein the motor energizing circuit is adapted to be directly coupled to an A.C. source;

the unipolarity voltage means includes a transformer having a primary winding adapted to be directly coupled to the A.C. source, a secondary winding, and rectifying means having unipolarity outputs, said primary and secondary windings being isolated from each other; and the capacitance is serially connected with the resistance across the unipolarity outputs.

9. A motor protection circuit comprising motor power switch means motor heat sensing means for terminating operation of the motor power switch means in response to an overheated condition, timing means electrically energized by operation of the motor power switch means for also terminating operation of the motor power switch means after a predetermined delay, a lubricating fluid pressure responsive switch, unipolarity voltage means, a capacitance, a resistance, said capacitance and said resistance connected in series across the unipolarity voltage means, means responsive to a predetermined charge on the capacitance for terminating operation of the motor power switch means, and switch means connected in series with the capacitance and resistance, said switch means being responsive to power failure for operating to prevent discharge of the capacitance.

10. A motor protection circuit as claimed in claim 9 wherein the switch means includes a semiconductor device having a PN junction connected in series with the capacitance and resistance, and means responsive to the presence of power for forward biasing the PN junction.

11. A motor protection circuit as claimed in claim 10 wherein the semiconductor device is a transistor, and the PN junction is the collector-base junction of the transistor.

12. A protection circuit for a three phase refrigeration motor and compressor comprising a contactor having three normally open contacts and coil means for simultaneously closing the three contacts of the contactor to connect the motor to a three phase source;

an energizing circuit for the coil means of the contactor including control switch means and protection switch means serially connected with the coil means of the contactor;

a transformer having a primary winding adapted to be energized by an alternating current source and having a secondary winding;

voltage rectifying means connected to the secondary winding of the transformer for producing a unipolarity voltage across first and second terminals;

relay winding means having one end connected to the first terminal for rendering the protection switch means conductive;

semiconductor switch means having a first electrode connected to the other end of the relay winding means and a second electrode connected to the second terminal, said semiconductor switch means having an input electrode for rendering the semiconductor switch means conductive between the first and second electrodes when the input electrode is energized;

first, second and third resistances connected at one ends to the first terminal, said first, second and third resistances having a positive temperature coefficient for sensing the temperature of respective windings of the motor;

fourth, fifth and sixth resistances connected in between the respective other ends of the first, second and third resistances and the second terminal;

seventh and eighth resistances connected in series between the first and second terminals;

a ninth resistance connected at one end to the first terminal;

a first capacitance;

a tenth resistance connected between the other end of the ninth resistance and one side of the first capacitance;

a manual double throw pressure reset switch having a contact arm connected to the other side of the first capacitance and having a normally open contact and a normal closed contact;

a first transistor having a collector-base junction connected between the normally closed contact and the second terminal;

an eleventh resistance connected between the normally open contact and the one side of the first capacitance;

a second transistor having an emitter connected to the first terminal;

a twelfth resistance connected between the collector of the second transistor and the collector of the first transistor;

a thirteenth resistance connected between the base of the second transistor and the second terminal;

a lamp connected across the control switch for being energized when the control switch is open;

a light sensitive resistance in proximity to the lamp to be illuminated by the lamp and connected across the tenth resistance and the first capacitance, said light sensitive resistance having a low resistance value when illuminated and having a high resistance value when not illuminated;

lubricating fluid pressure responsive switch means having a pair of normally open contacts connected across the tenth resistance and the first capacitance, said lubricating fluid pressure responsive switch adapted to close the contacts thereof when a predetermined lubricating fluid pressure is sensed;

a quad integrated circuit amplifier unit having first, second, third and fourth high gain amplifiers fourteenth and fifteenth resistances connected in series across the first and second terminals;

said first amplifier having a pair of inputs connected between the junction of the fourteenth and fifteenth resistances and the junction of the capacitance and the tenth resistance;

said second amplifier having a pair of inputs connected between the junction of the seventh and eighth resistances and the junction of the first and fourth resistances;

said third amplifier having a pair of inputs connected between the junction of the seventh and eighth resistances and the junction of the second and fifth resistances;

said fourth amplifier having a pair of inputs connected between the junction of the seventh and eighth resistances and the junction of the third and sixth resistances;

filter and delay means connected at one end to the input electrode of the semiconductor switch means;

or-gate means including first, second, third and fourth diodes connected in parallel between the respective outputs of the first, second, third and fourth amplifiers and the other end of the filter and delay means;

a sixteen resistance and a fifth diode serially connected between the junction of the seventh and eighth resistances and the first electrode of the semiconductor switch means;

a seventeenth resistance connected at one end to the first terminal;

a second capacitance having one side connected to the other end of the seventeenth resistance and having its other side connected to the second terminal;

a sixth diode connected between the junction of the sixteenth resistance and the fifth diode and the junction of the second capacitance and the seventeenth resistance;

an eighteenth resistance and a seventh diode serially connected between the output and an input of the first amplifier; and a nineteenth resistance and a normally open manual thermal reset switch serially connected between the junction of the sixteenth resistance and fifth diode and the second terminal.

13. A motor protection circuit comprising a motor energizing A.C. circuit including a series A.C. control switch for controlling operation of the motor energizing circuit, means capable of being energized for producing a unipolarity voltage, a timing resistance, a timing capacitance, said timing resistance and said timing capacitance connected in a series circuit coupled to the unipolarity voltage producing means, a voltage divider having second and third resistances connected in series across the unipolarity voltage producing means, an operational amplifier having a pair of inputs connected, respectively, to the junction between the timing capacitance and timing resistance and to the junction between the second and third resistances, means for terminating energization of the motor energizing circuit in response to an output of the operational amplifier, positive feedback means connected between the output and one of the pair of inputs of the operational amplifier for maintaining the predetermined charge condition on the capacitance to maintain operation of the means for terminating energization of a motor, switch means responsive to a predetermined lubricating fluid pressure for preventing the charging of the capacitance in response to a predetermined lubricating fluid pressure, and isolation means having means coupled across the A.C. control switch and having means connected in a shunt circuit across the timing capacitance for shunting the timing capacitance when the control switch terminates operation of the motor, said means connected in a shunt circuit being isolated from said means coupled across the A.C. control switch.

* * * * *